United States Patent [19]

Groult

[11] Patent Number: 4,573,130

[45] Date of Patent: Feb. 25, 1986

[54] INSTALLATION FOR MONITORING AND CONTROLLING A PRODUCTION MACHINE

[75] Inventor: Emile J. L. Groult, Vaux Le Penil Melun, France

[73] Assignee: Cofadis S.A., Marigny, France

[21] Appl. No.: 425,499

[22] Filed: Sep. 28, 1982

[30] Foreign Application Priority Data

Oct. 21, 1981 [FR] France ............................... 81 19775

[51] Int. Cl.[4] ............................................. G06F 15/20

[52] U.S. Cl. ....................................... 364/552; 177/1; 177/50; 177/200; 209/551; 364/567

[58] Field of Search ............... 364/403, 478, 552, 567; 209/551, 592; 177/1, 50, 200

[56] References Cited

U.S. PATENT DOCUMENTS

| | | | |
|---|---|---|---|
| 3,552,511 | 1/1971 | Marcheso et al. | 177/1 |
| 3,704,362 | 11/1972 | Kolby et al. | 364/552 |
| 4,139,070 | 2/1979 | Hanson et al. | 177/200 |
| 4,157,738 | 6/1979 | Nishiguchi et al. | 364/567 X |
| 4,385,671 | 5/1983 | Hirano | 364/567 X |
| 4,419,734 | 12/1983 | Wolfson et al. | 364/478 X |

*Primary Examiner*—Parshotam S. Lall
*Assistant Examiner*—Edward R. Cosimano
*Attorney, Agent, or Firm*—Woodard, Weikart, Emhardt & Naughton

[57] ABSTRACT

An installation for monitoring and controlling a machine for producing items which at the end of production thereof are subjected to quality control with rejection of defective items, comprises a computing means (4), a detector (5) for sensing the number of items produced, a weighing machine for weighing the reject items, a precision weighing means for weighing an item produced, and a display means, the computing means operating on the basis of the data supplied thereto by the sensor, the weighing machine and the precision weighing means to provide the number of items produced, the number of items rejected and the difference therebetween, constituting the number of accepted items.

6 Claims, 1 Drawing Figure

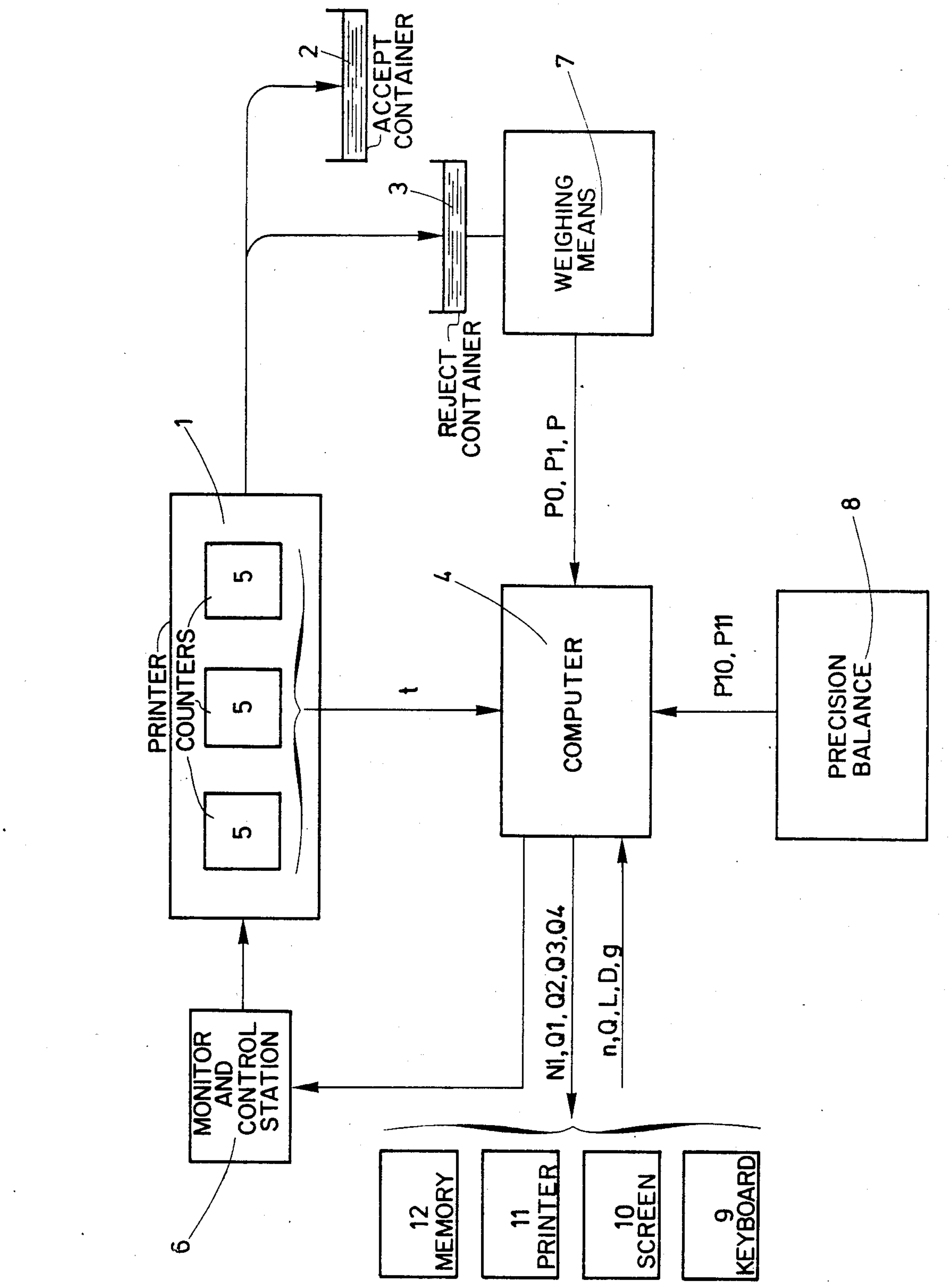
2
ACCEPT CONTAINER
3
REJECT CONTAINER
7
WEIGHING MEANS
P0, P1, P
1
PRINTER
COUNTERS
5
5
5
t
4
COMPUTER
P10, P11
8
PRECISION BALANCE
MONITOR AND CONTROL STATION
6
N1,Q1,Q2,Q3,Q4
n,Q,L,D,g
12 MEMORY
11 PRINTER
10 SCREEN
9 KEYBOARD

INSTALLATION FOR MONITORING AND CONTROLLING A PRODUCTION MACHINE

BACKGROUND OF THE INVENTION

1. Field of the Invention

This invention is in the field of computer systems for monitoring and control. The present invention concerns an installation for monitoring and controlling a production machine or line for producing items or components which are subjected to production quality control with rejection of items or components which are not of a satisfactory standard, for precision measuring of the amounts of items produced and accepted as satisfactory, thereby to stop production when the required quantity of items has been produced.

2. Description of the Related Art

A problem which arises with some production machines or lines is that they may give rise to not inconsiderable levels or rejects products, which are often difficult to forecast by means of statistical calculations. This problem becomes more and more acute as the cost of production and in particular the cost of raw materials increases, thus requiring closer monitoring and control on the production process.

At the present time, use is made of counters for counting the number of items produced by the machine or line. However, as the proportion of items rejected as defective may vary relatively from one production process or machine to another, the total quantity of items produced as being satisfactory to the quality control procedure may often be greater than the actual quantity required. In fact, such an over-production is a necessary precaution or safety margin under present-day manufacturing conditions, so as to avoid any necessity to start up the installation again, to produce a small number of items, because the actual number of items produced in satisfactory form was in fact too low, because of the number of items rejected as defective. It will be appreciated in this connection that it is often very difficult or even impossible to achieve an accurate forecast of the number of items which will be found as defective and which will therefore have to be rejected, while in addition, as the costs involved in re-starting a production machine or line are substantial, production managers accept safety margins which may frequently turn out to be excessive, thus resulting in excessive quantities of items being produced, which in turn involves wastage of raw material, time and energy.

It has been noted that this kind of situation may occur in particular in printing processes, where it has been found that the losses due to an excessive print run, that is to say, an excessive number of items printed, particularly in the case of short printing runs, may be up to around 10%.

According to the present invention, there is provided an installation for monitoring and controlling a machine for producing items which at the end of production thereof are subjected to quality control with rejection of defective items, comprising a sensor for determining the number of items produced, a weighing means for supplying the weight of all the items rejected since the commencement of production, a precision weighing means for determining the mean weight of an item produced, a keyboard, display means, and a computing means connected to the sensor, weighing means, precision weighing means, keyboard and display means and operable on the basis of data supplied by the sensor, the weighing means and the precision weighing means to supply the display means with the number of items produced, the number of items rejected, and the number of acceptable items as constituted by the difference between the number of items produced and the number of items rejected.

The computing and operating program of the installation is introduced either from a disc or a magnetic tape, or the program may be contained in a read only memory of the unit which, by broad use of language, is referred to as the computing means.

As the production parameters are variable, when the machine is first set in operation, general re-initialisation is effected, by zeroing all the counters, followed by the introduction of the parameters relating to the production process to be carried out, such parameters corresponding to theoretical or reference values. In the course of the production process, as soon as possible, actual parameters will be determined by means of real measurement operations, and those parameters will be introduced into the installation, for example directly, by means of the precision weighing means or balance.

Although, as will be seen from the description hereinafter, a main purpose of the present monitoring and controlling installation is to stop operation of the production machine as soon as the reference or desired quantity of items has been produced, the installation also provide a large number of by-products or auxiliary data relating to the production procedure, the starting materials and the items produced.

In the course of production, the installation may also monitor the initial parameters and the parameters produced in the course of production, by measurements taken from point to point or from time to time to check for proper progress in regard to the mode of operation of the machine or to actuate an alarm signal, or even to stop the machine if certain programmed thresholds are exceeded.

Finally, the overall information produced may be utilised for invoicing, stock control, and the like.

SUMMARY OF THE INVENTION

A printing apparatus comprising a printer, a sensor to count the total number of items printed by the printer, first weighing means receiving rejected printed items from the printer and supplying the total weight of the rejected printed items, second weighing means supplying the mean weight of an item produced by the printer, a computer receiving the total number, the total weight and the mean weight and computing the total number of acceptable printed items, and control means connected to the computer and the printer to control stopping of the printer once the desired total number of acceptable printed items have been achieved.

It is an object of the present invention to provide a new and improved device for monitoring and controlling a printing machine.

Related objects and advantages of the present invention will be apparent from the following description.

BRIEF DESCRIPTION OF THE DRAWING

The drawing is a block diagram of the installation for monitoring and controlling a printing machine.

DESCRIPTION OF THE PREFERRED EMBODIMENT

An embodiment of an installation according to the present invention will now be described by way of example with reference to the single FIGURE of the accompanying drawing which shows a diagrammatic view of an installation for monitoring and controlling a printing press such as a rotary printing press.

Referring to the drawing, the monitoring and control installation is shown in operative association with a printing machine 1 such as a rotary printing machine comprising an unwinding or feed means, printing units, a drying unit and a folding unit, for printing sheets in one or more colours.

On issuing from the machine, the printed sheets are sorted so as to retain only satisfactory items, that is to say, items which are not blemished or suffer from other defects. The satisfactory items are collected in a container 2 for subsequent operations to be carried out thereon, while defective or reject items are put in a reject container or bin 3.

The monitoring and control installation comprises a computing or calculating means such as a minicomputer 4 which is connected to at least one pick-up or detector 5 on the machine 1. The detector 5 is a rotary detector or revolution counter. The computing means 4 is connected to the monitoring and control station 6 of the machine 1, to control operation or stopping thereof.

The installation comprises a first weighing means 7 such as a balance-type weighing machine for receiving the container 3 carrying the reject items and, in parallel with the weighing means 7, a precision weighing means such as a precision balance 8.

The installation further includes, for the purposes of communication with the computing unit 4, a keyboard 9, a screen 10, a printer 11 and a mass memory read means 12.

Broadly, in accordance with the invention, the computing means 4 counts the number of items printed by the machine 1, and the number of items rejected, in order thereby to calculate the difference between the number of items printed and the number of reject items, to arrive at the number of satisfactory items produced at a given moment. By means of a subtraction operation, taking the total number of satisfactory items required to be produced, the computing means 4 determines the number of items remaining to be printed.

The computing means 4 stops the machine 1 when the number Q1 of satisfactory items (being the difference between the number of items printed and the number of reject items) is equal to the number Q2 of items required.

The different interfaces connecting the computing means 4 to the peripheral devices such as the detector 5, the monitoring and control station 6, the weighing means 7, the weighing means 8, the keyboard 9 and the screen 10 are not shown in the drawing, for the sake of simplicity.

The detector 5 is a rotary detector for counting the number of revolutions performed by a printing roll, which corresponds to the number of items printed. In general, one revolution of the roll corresponds to printing one item; however, it may also correspond to printing a number of items. The rotary detector 5 may be a mechanical contact detector or preferably a contact-less detector such as an optical-electronic detector of phonic wheel type, an optical-electronic detector of reflection type, an electromagnetic detector, in particular a Hall effect detector, and the like.

In the simplest embodiment, a reflecting or coloured marker is fixed on one of the ends of a roll and the emitter-receiver assembly of the detector is disposed opposite the path of movement of the marker.

When the installation is used in association with a machine for manufacturing or machining parts, the detector may be for example a means for detecting movement of a component (a light barrier arrangement, a magnetic detector or a mechanical detector) which is operative to count the number of parts passing through the machine, or the number of movements of a tool such as a stamp or punch or the like.

In order to avoid parasitic phenomena and counting errors and to provide a higher degree of reliability in regard to detecting the number of revolutions performed (or the number of items printed), it may be desirable to provide a plurality of detectors, the output signals of which are combined by means of a logic circuit of AND type, before being transmitted to the computing means 4 to validate the signals produced by the detectors.

The detector 5 supplies the signal t representing the number of revolutions performed to the computing means 4 which, depending on the circumstances involved, multiplies the number t by a coefficient (n=1, 2 . . . ).

The detectors include electronic circuits such as amplifiers, filters, signal shapers and the like which will not be described in detail herein.

The monitoring and control station 6 is part of the machine 1. The station 6 permits the mode of operation of the different motors to be controlled and operation thereof to be monitored. The computing means 4 is operative to control the station 6, in particular to control starting and stopping the machine 1.

The weighing machine 7 provides for permanent weighing of the defective items which are rejected in the container 3, and supplies the weight P thereof to the computing means 4. Taking that weight P, the computing means 4 determines the number of reject items. More specifically, the weighing machine 7 first supplies the empty weight or tare weight PO corresponding to the container 3, that weight varying from one container to another. Then, at the end of the phase of starting up the machine (which may be referred to as the 'start-up' or setting phase), the weighing machine 7 supplies the weight P1 corresponding to the accumulated weight of the reject items in the start-up and regulating phase, and the tare weight PO.

In the course of the setting or start-up phase, all the items produced are rejected since by definition the machine is in the course of being set up. In that case, the number of items produced is equal to the number of reject items. The end of the setting-up phase is shown by the production of acceptable items (with a reject item produced from time to time).

The computing means 4 can therefore go into its proper operative phase, being the printing run phase in the case of the illustrated example of use in association with a printing machine, that is to say, a phase which involves counting the acceptable items, as from the moment that a difference occurs between the number of items produced and the number of items rejected. This transfer into the printing run phase may take place automatically.

The precision balance 8 makes it possible to determine the weight of an item, in order to supply that information as indicated at P10 to the computing means 4.

The precision balance 8 may not only effect the initial weighing operation to provide the information P10, but it may also serve to carry out various intermediate weighing operations in order to monitor the ratios of inks or dyes, take account of variations in gram weight when there is a change of paper, and the like.

The balance 8 is operable in particular to determine the weight of an item, that is to say, the weight of paper and ink. Depending on the degree of precision to be achieved in the weighing operation, it is possible to weigh a predetermined number of items, in which case the computing means 4 is operable on the basis of the weighing result to determine a mean weight.

The keyboard 9 provides for introducing into the computing means 4 the various items of data required for operation of the installation, and in particular:

zeroing of the whole of the system (general reinitialisation);

indication of the phase of initialising parameters and introducing such parameters, that phase being necessary in order to enable the machine to be started.

In greater detail:

1. Initialisation of the system

Before the machine is set in operation on each occasion, the operator introduces for example two codes:

the case or order number, and the nature of the paper.

He also introduces the four parameters to be computed, namely:

the width L (width of the strip to be printed), the gram weight g of the paper, the number of papers or strips in a revolution n, the quantity Q required, in number of revolutions, that is to say, the number of items or a fraction of the number of items, and development D, that is to say, the length of an item.

2. Indication of the setting-up phase

During the setting-up phase, that is to say, adjustment of the various printing units for ensuring that the colours or marks are in a proper condition of coincidence, unacceptable or defective items are rejected and counted. The weighing machine 7 weighs the number of defective items, corresponding to the setting-up operations. The weighing result P1 is supplied to the computing means 4 which can thus determine the number of papers or items N1 which were required to carry out the setting-up operation. That information may be used for example for statistical purposes, to confirm the difficulty of the work to be done, the difficulty involved in the preparatory adjustments, and the like.

3. Indication of the printing run phase

The printing run phase indication serves to begin counting of the printing batch after the first acceptable item is produced.

On the basis of that indication, one of the counters of the computing means 4 is reset to zero, that counter being assigned to counting the printing run phase.

When the arrangement automatically goes into the printing run phase, the above-mentioned printing run phase indication is no longer required.

The various data supplied by the computing means 4 are displayed on the screen 10 and may be printed by a printer 11 or stored in a mass memory such as a magnetic disc, to be utilised by for example an accounting computer, for purposes of accounting, invoicing or statistics.

Generally, the computing means 4 may be associated with a number of groups of peripheral units in a parallel arrangement such as groups of detectors, weighing machines, precision balances and keyboards with screens and printers, to monitor the operation of a number of machines or presses and in particular a number of rotary presses.

The computing means 4 which is for example a computer, a minicomputer or a microprocessor provided with its read only and random access memories, its registers, and the like, receives the various measuring signals as follows:

the signal t from the one or more detectors 5, the signals in respect of the accumulated weights P0, P1, P from the weighing machine 7, and the signals P10, P11 . . . from the precision balance 8.

On the basis of the width L, development D and the number of strips n, as well as the gram weight g of the paper printed, the computing means 4 determines the weight of an item: $n \times L \times D \times g$. Taking the weight P supplied by the weighing machine 7, it determines the number of reject items, namely:

$$(P/n \cdot L \cdot D \cdot g)$$

The computing means 4 determines the quantity Q1 of acceptable items. That quantity Q1 is the difference between the number Q2 of items printed and the number Q4 of items rejected during the printing run phase, plus the quantity Q3 of rejects during the adjusting phase (as the weight is cumulative, that gives:

$$Q3 + Q4 = (P)/n \cdot L \cdot D \cdot g).$$

Depending on circumstances, it may be desirable to ascertain and record the number of items printed, including the items Q3 which were involved in the initial setting up adjustments (setting-up phase).

Under those circumstances, approximate information is obtained by taking the theoretical weight of an item (the weight of paper, possibly corrected in consideration of the theoretical weight of the ink). Counting in respect of the first items is effected, dividing the weight supplied by the weighing machine 7 by the theoretical weight. Then, as soon as there are one or more items at the discharge from the machine, the weight thereof is ascertained by means of the precision balance 8; that information is supplied to the computing means 4 which substitutes that value for the theoretical value, while checking that the actual or practical value is a plausible value, that is to say, it is between certain limits in relation to the theoretical weight.

In the course of operation, the display screen makes it possible to follow progress in the production process. In addition, the screen may be used to signal various incidents or hitches or that the end of the production process is approaching.

Finally, at the end of a production run, the printer 11 prints out the various data relating to the production process, for example:

the case number the nature of the paper the width
the gram weight
the number of strips
the setting-up batch
the batch in the course of printing
the weight consumed
the quantity required
the number of good items.

A number of definitions is set out below, by way of information:

The setting-up batch corresponds to the weight of the items produced up to the moment of entry into the printing run phase. This batch is expressed in weight and in number of revolutions.

The printing run batch corresponds to the difference between the weight of the total batch and the weight of the setting-up batch. This batch is expressed in weight and as a percentage of the number of revolutions required (weight of the printing run batch divided by the weight of an item 'p', divided by the number of revolutions required).

The weight consumed is equal to the number of turns multiplied by: n·L·D·g·(theoretical weight of an item) plus the weight of the reels or spools, spoilt or mackled sheets, etc.

The magnetic recording produced by the recording means 12 may include the same information for use thereof by a computer.

By way of example, an installation was designed, comprising the following characteristics, for use in association with a rotary press.

Weighing machine:
maximum load: 1500 kg
precision: 3000 divisions, i.e. 500 g/division
measuring time: 0.5 sec.
Precision balance:
maximum load: 1200 g
precision: 1 centigram.
Computing unit comprising:
a microprocessor Z 80
a memory PROM
a memory CMOS (4 K octets)
a keyboard
a display console with zone addressing
a printer
a mass memory.

Generally, the installation according to the invention can be used not only for printing press plants or book printing plants of typographic, helio and offset press type, but also any component production machine or line involving a reject operation at the end of the production line.

References used in the description are as follows:

PO: initial weight (tare)
P1: weight of rejects at the end of the adjusting and starting-up phase
P: weight of rejects which may vary in the course of printing
P10: real weight of one (or more) items at the beginning of the production process
P11: real weight of one (or more) items in the course of production
Q1: quantity required (quantity of satisfactory items)
Q2: quantity produced, comprising satisfactory items and reject items
Q3: quantity rejected during the initial adjustment phase
Q4: quantity rejected during the production phase
n: number of strips
L: width of the strip to be printed
D: development of the item
g: gram weight of the paper
t: number of printing revolutions.

It will be seen that the above-described installation may provide considerable advantages from the point of view of economy as at the present time, in printing, to take an example, the losses due to printing excessive numbers of printed items, particularly when dealing with short printing runs, may be up to 10%. The installation as described hereinbefore can permit such losses to be virtually reduced to zero. In addition, as the operators of the machine are no longer required to monitor the quantities of items produced, in an effort to reduce the losses due to excessive production, they may devote themselves to monitoring and controlling the quality of the items produced.

Therefore, the above-described monitoring and control installation permits operation of a production machine or line, such as a printing press, for example a rotary printing press, to be properly controlled and managed, so as to minimise the reject rate by producing just the required number of items which are accepted as being of satisfactory standard. The installation also provides for example accounting or statistical information relating to the conditions of starting up production, the quantity of items or components rejected, production times, and like factors, for controlling the items produced, improving the characterisitics or features thereof and enhancing regularity in respect of quality, while also reducing costs by a reduction in and possibly even suppression of rejects and waste.

I claim:

1. An installation for monitoring a printing machine to determine the total printed items and the rejected printed items while controlling said printing machine to produce a predetermined number of acceptable printed items comprising:

counting and sensing means associated with said printing machine and operable to count the number of items produced and provide corresponding output data;
a weighing means for supplying the weight of said rejected printed items;
a precision weighing means for determining the mean weight of an item produced;
a keyboard, for inputting operating operating data;
display means;
computing means connected to said counting and sensing means, said weighing means, said precision weighing means, said keyboard and said display means and on the basis of data supplied by the counting and sensing means, the weighing means and the precision weighing means supplying the display means with the number of items produced, the number of items rejected, and the number of acceptable items as determined by the difference between the number of items produced and the number of items rejected; and,
control means connected to said computer means and said printing machine to control stopping of said printing machine once the predetermined number of acceptable printed items are printed.

2. An installation according to claim 1 wherein said display means includes a printer.

3. An installation according to claim 1 or claim 2 wherein said computing means is also connected to a storage means for storing the data supplied by the computing means.

4. An installation according to claim 1 wherein said counting and sensing means includes a rotation sensor.

5. An installation according to claim 1 wherein said counting and sensing means includes an optical electronic sensor.

6. An apparatus to produce a total number of acceptable printed items by determining the total number of items printed and the weight of rejected printed items:

a printer;

a sensor module to count the total number of items printed by said printer;

first weighing means receiving rejected printed items from said printer and supplying the total weight of said rejected printed items;

second weighing means supplying the mean weight of an item produced by said printer;

a computer receiving said total number, said total weight and said mean weight and computing the total number of acceptable printed items; and, control means connected to said computer and said printer to control stopping of said printer once the total number of acceptable printed items have been achieved.

* * * * *

UNITED STATES PATENT AND TRADEMARK OFFICE

CERTIFICATE OF CORRECTION

PATENT NO. : 4,573,130

DATED : February 25, 1986

INVENTOR(S) : Emile J. L. Groult

It is certified that error appears in the above-identified patent and that said Letters Patent is hereby corrected as shown below:

In the Claims:

In column 8, line 48, please change the line to read as follows: "a keyboard, for inputting operating data;".

Signed and Sealed this

*Third* Day of *June 1986*

[SEAL]

*Attest:*

DONALD J. QUIGG

*Attesting Officer* *Commissioner of Patents and Trademarks*